(12) United States Patent
Gupta et al.

(10) Patent No.: US 10,225,332 B2
(45) Date of Patent: Mar. 5, 2019

(54) SHARING A DATA MANAGEMENT POLICY WITH A LOAD BALANCER

(71) Applicant: International Business Machines Corporation, Armonk, NY (US)

(72) Inventors: Aayush Gupta, San Jose, CA (US); Dean Hildebrand, Bellingham, WA (US); Nagapramod S. Mandagere, San Jose, CA (US); Shripad Jayant Nadgowda, Nagpur (IN); William W. Owen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/081,742

(22) Filed: Mar. 25, 2016

(65) Prior Publication Data

US 2017/0279875 A1 Sep. 28, 2017

(51) Int. Cl.
*H04L 29/08* (2006.01)
*H04L 12/803* (2013.01)

(52) U.S. Cl.
CPC ........ *H04L 67/1002* (2013.01); *H04L 47/125* (2013.01); *H04L 67/10* (2013.01); *H04L 67/1031* (2013.01); *H04L 67/1097* (2013.01); *H04L 67/2842* (2013.01)

(58) Field of Classification Search
CPC ............ H04L 67/1002; H04L 67/1097; H04L 67/2842; H04L 47/125
See application file for complete search history.

(56) References Cited

U.S. PATENT DOCUMENTS

| | | | |
|---|---|---|---|
| 8,612,550 B2 | 12/2013 | Yoo et al. | |
| 2013/0290466 A1 | 10/2013 | Lee et al. | |
| 2014/0089387 A1 | 3/2014 | Chapman et al. | |
| 2014/0372550 A1 | 12/2014 | Said et al. | |
| 2015/0074222 A1* | 3/2015 | Liang | H04L 67/2842 709/214 |
| 2015/0215389 A1 | 7/2015 | Spencer | |

OTHER PUBLICATIONS

Sukthankar et al., "Policy based mechanism for managing workloads across multiple workload managers in a Virtualised Environment," IP.com, Apr. 8, 2009, 4 pages.
Khiyaita et al., "Load Balancing Cloud Computing: State of Art," IEEE, Network Security and Systems, Apr. 20-21, 2012, pp. 106-109.

* cited by examiner

*Primary Examiner* — Kim T Nguyen
(74) *Attorney, Agent, or Firm* — Zilka-Kotab, P.C.

(57) ABSTRACT

In one general embodiment, a computer program product for sharing a data management policy with a load balancer comprises a computer readable storage medium having program instructions embodied therewith, wherein the computer readable storage medium is not a transitory signal per se. Additionally, the program instructions are executable by a processor to cause the processor to perform a method comprising analyzing, by the processor, a plurality of data management factors within an object-based storage system, determining, by the processor, a data management policy for predetermined data within the object-based storage system, based on the analyzing, and sharing, by the processor, the data management policy for the predetermined data with a load balancer associated with the object-based storage system.

20 Claims, 7 Drawing Sheets

SHARING A DATA MANAGEMENT POLICY WITH A LOAD BALANCER

BACKGROUND

The present invention relates to managing data requests, and more specifically, this invention relates to optimizing the operations of one or more load balancers.

It is common for clients to access proxy servers to store and retrieve data. Load balancing of requests across the proxy servers is utilized to distribute requests based upon various criteria. However, current load balancing techniques do not take various characteristics of an underlying object store into account. This may place unnecessarily large loads on the system and may reduce performance.

SUMMARY

A computer-implemented method according to one embodiment includes analyzing a plurality of data management factors within an object-based storage system, determining a data management policy for predetermined data within the object-based storage system, based on the analyzing, and sharing the data management policy for the predetermined data with a load balancer associated with the object-based storage system.

According to another embodiment, a computer program product for sharing a data management policy with a load balancer comprises a computer readable storage medium having program instructions embodied therewith, wherein the computer readable storage medium is not a transitory signal per se. Additionally, the program instructions are executable by a processor to cause the processor to perform a method comprising analyzing, by the processor, a plurality of data management factors within an object-based storage system, determining, by the processor, a data management policy for predetermined data within the object-based storage system, based on the analyzing, and sharing, by the processor, the data management policy for the predetermined data with a load balancer associated with the object-based storage system.

A system according to another embodiment includes a processor and logic integrated with and/or executable by the processor, where the logic is configured to analyze a plurality of data management factors within an object-based storage system, determine a data management policy for predetermined data within the object-based storage system, based on the analyzing, and share the data management policy for the predetermined data with a load balancer associated with the object-based storage system.

Other aspects and embodiments of the present invention will become apparent from the following detailed description, which, when taken in conjunction with the drawings, illustrate by way of example the principles of the invention.

DETAILED DESCRIPTION

Figure 1:
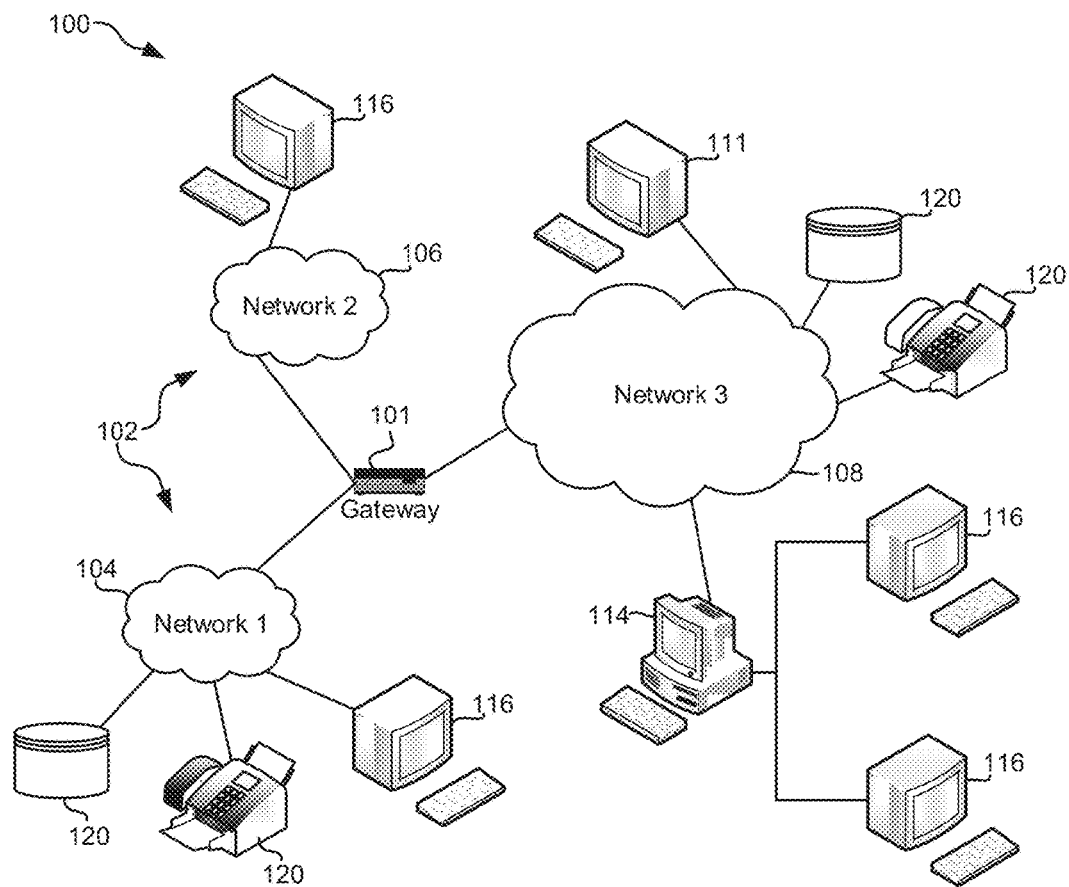
FIG. 1 illustrates a network architecture, in accordance with one embodiment.

The following description discloses several preferred embodiments of systems, methods and computer program products for sharing a data management policy with a load balancer. Various embodiments provide a method to use a location and cache manager to share a data management policy of an object-based storage system with a load balancer servicing that system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for sharing a data management policy with a load balancer.

In one general embodiment, a computer program product for sharing a data management policy with a load balancer comprises a computer readable storage medium having program instructions embodied therewith, wherein the computer readable storage medium is not a transitory signal per se. Additionally, the program instructions are executable by a processor to cause the processor to perform a method comprising analyzing, by the processor, a plurality of data management factors within an object-based storage system, determining, by the processor, a data management policy for predetermined data within the object-based storage system, based on the analyzing, and sharing, by the processor, the data management policy for the predetermined data with a load balancer associated with the object-based storage system.

In another general embodiment, a computer program product for sharing a data management policy with a load balancer comprises a computer readable storage medium having program instructions embodied therewith, wherein the computer readable storage medium is not a transitory signal per se. Additionally, the program instructions are executable by a processor to cause the processor to perform a method comprising analyzing, by the processor, a plurality of data management factors within an object-based storage system, determining, by the processor, a data management policy for predetermined data within the object-based storage system, based on the analyzing, and sharing, by the processor, the data management policy for the predetermined data with a load balancer associated with the object-based storage system.

In another general embodiment, a system includes a processor and logic integrated with and/or executable by the processor, where the logic is configured to analyze a plurality of data management factors within an object-based storage system, determine a data management policy for predetermined data within the object-based storage system, based on the analyzing, and share the data management policy for the predetermined data with a load balancer associated with the object-based storage system.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
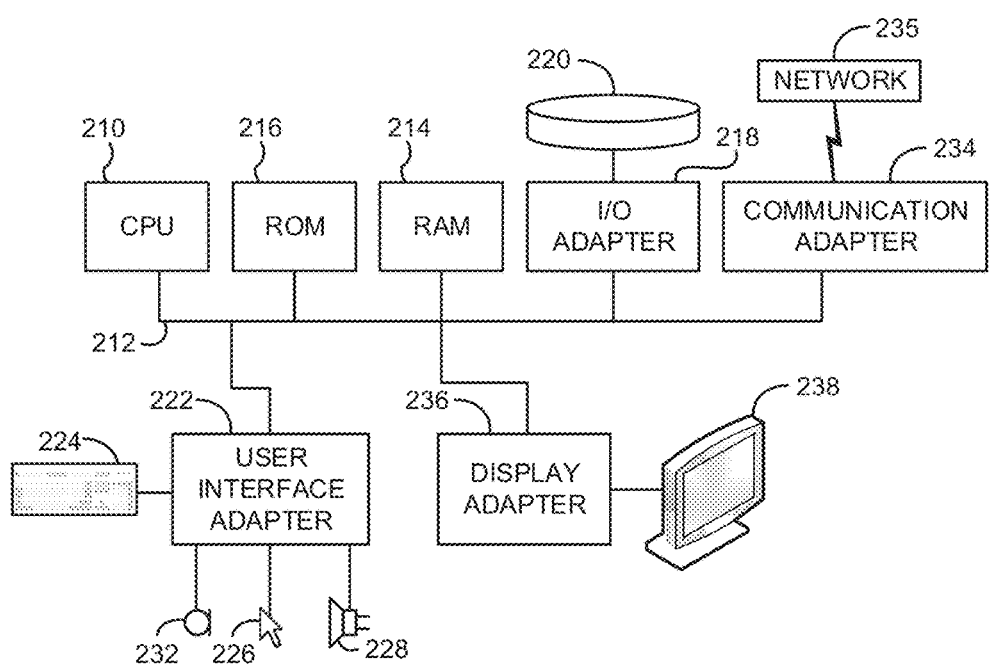
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
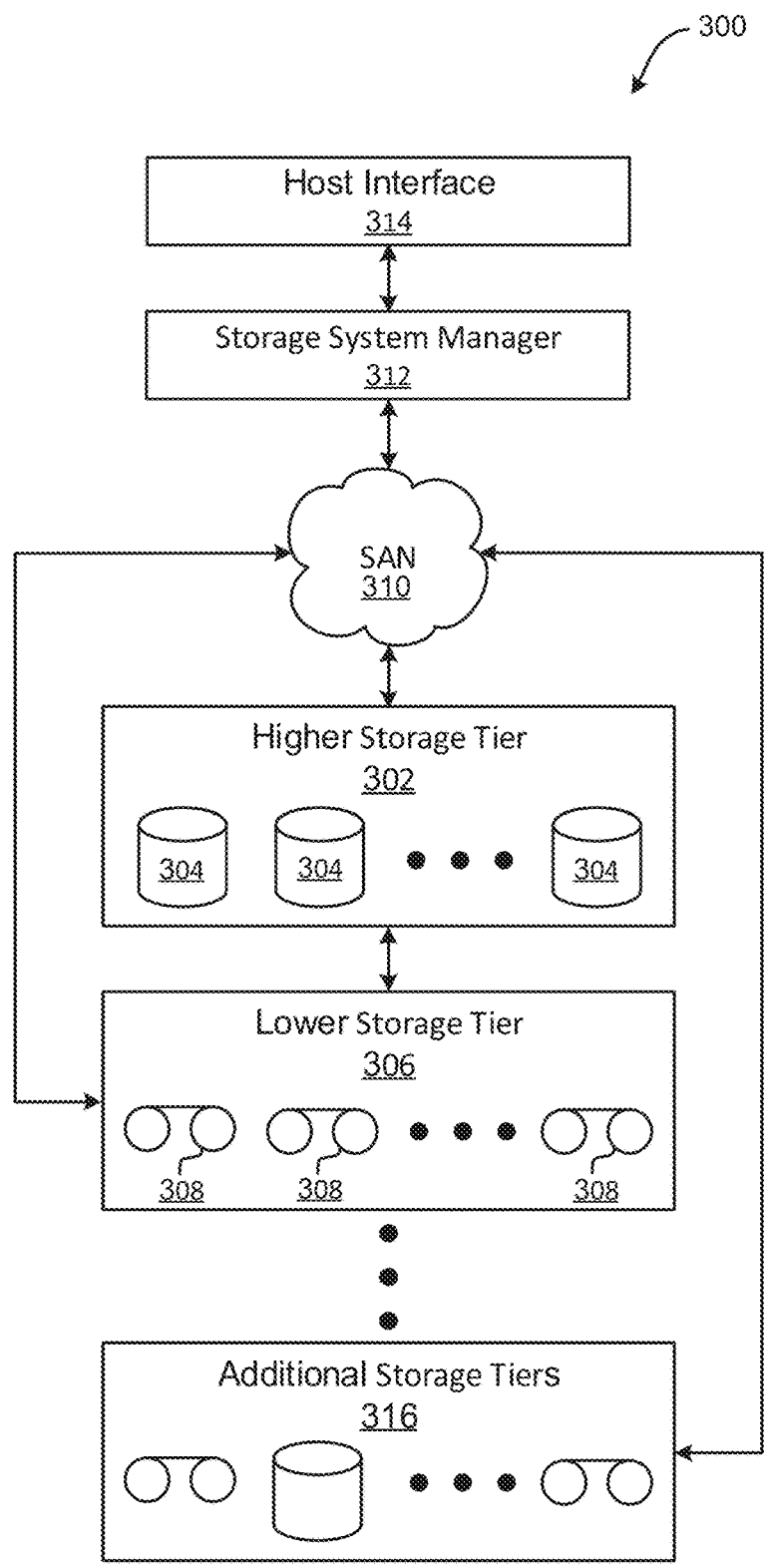
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
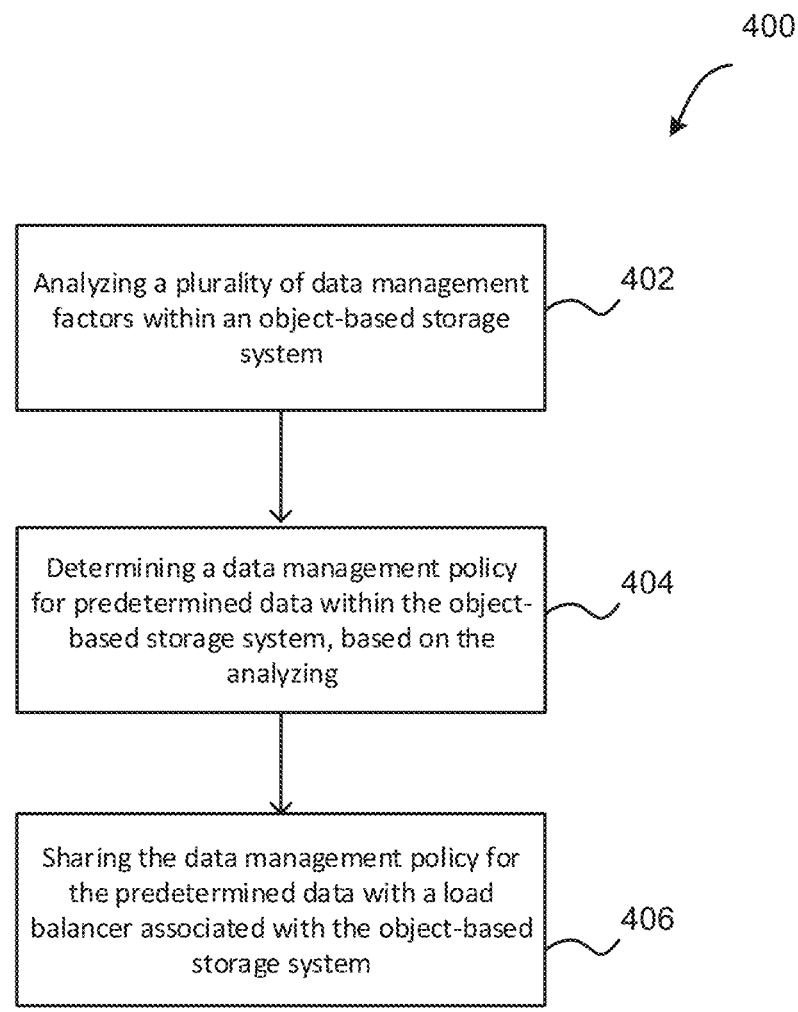
FIG. 4 illustrates a method for sharing a data management policy with a load balancer, in accordance with one embodiment.

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of data management factors are analyzed within an object-based storage system. In one embodiment, the object-based storage system may include a system for storing data. In another embodiment, the object-based storage system may be associated with one or more accounts. For example, one or more users may have an associated account within the object-based storage system. In another embodiment, each of the one or more accounts may include one or more containers or buckets (depending on the object protocol being used) storing one or more objects. The account, container, and/or bucket information of the object storage system may be stored separately from the object data, possibly using different placement algorithms, availability levels. Due to this, different routing decisions may need to be made depending on the type of data requested (e.g., account, container/bucket, object).

Additionally, in one embodiment, the object-based storage system may include a plurality of storage nodes. For example, the object-based storage system may include a plurality of physical or virtual storage nodes storing data (e.g., objects, etc.), and each storage node may have an associated proxy server. In another example, each of the plurality of storage nodes may include one or more caches. In another embodiment, the object-based storage system may include a plurality of proxy servers. For example, each proxy server may include software (e.g., a software daemon, etc.) that receives and manages data requests to the proxy server's associated storage node. In another embodiment, the object-based storage system may include cloud storage.

Further, in one embodiment, the plurality of data management factors may include a plurality of methods by which data is received, routed, and stored within the object-based storage system. For example, the plurality of data management factors may include one or more data placement algorithms that dictate how data is stored within the object-based storage system. In another embodiment, the one or more data placement algorithms may include one or more data routing algorithms that indicate how incoming and outgoing data is routed within the object-based storage system.

Further still, in one embodiment, the plurality of data management factors may also include one or more token management policies. For example, the one or more token management policies may dictate which proxy servers are able to perform actions with respect to data stored on storage nodes within the object-based storage system. For example, a proxy server that currently has a token may be able to perform an action with respect to data in the storage node associated with the proxy server. In another embodiment, the one or more token management policies may provide guidelines for obtaining and releasing tokens within the object-based storage system.

Also, in one embodiment, the plurality of data management factors may also include data caching locations. For example, the data caching locations may indicate where predetermined data is cached within the plurality of storage nodes of the object-based storage system. In another embodiment, the data caching locations may be determined by one or more predetermined policies (e.g., one or more hashing schemes, etc.).

Further, as shown in FIG. 4, method 400 may proceed with operation 404, where a data management policy for predetermined data within the object-based storage system is determined, based on the analyzing. In one embodiment, the data management policy for the predetermined data may include a location of the predetermined data within the object-based storage system. For example, the predetermined data may be tracked within the object-based storage system according to the plurality of data management factors. For instance, the predetermined data may include one or more of objects, containers, accounts, searches, and extended filesystem attributes stored within the object-based storage system, as well as metadata associated with the predetermined data that is stored within the object-based storage system. In another embodiment, the analysis may include tracking the predetermined data to identify a location of the predetermined data within the system. In yet another embodiment, the predetermined data may include data that is requested to be accessed by a user of the object-based storage system.

Furthermore, in one embodiment, the data management policy may include one or more factors associated with how and where the data is stored and accessed within the object-based storage system. For example, the data management policy may include a caching policy that indicates when, how, and where the predetermined data is cached within the object-based storage system. In another embodiment, the data management policy may include a location policy that includes one or more structures implemented within the object-based storage system that are used during the access of the predetermined data within the object-based storage system.

For example, the location policy may include one or more token management policies by which data is accessed within the object-based storage system. In another example, the location policy may include one or more policies indicating a data access structure within the object-based storage system. For instance, the object-based storage system may implement one or more ring policies associated with a ring access structure that controls placement of data across the object-based storage system (e.g., a swift object ring, etc.).

Further still, as shown in FIG. 4, method 400 may proceed with operation 406, where the data management policy for the predetermined data is shared with a load balancer associated with the object-based storage system. In one embodiment, the load balancer may include a device that distributes requests for data within the object-based storage system (e.g., requests to read data, write data, modify data, etc.). For example, the load balancer may receive a plurality of requests to access data within the plurality of storage nodes of the object-based storage system, and the load balancer may route each of the plurality of requests to one of the plurality of proxy servers of the object-based storage system according to predetermined criteria.

Also, in one embodiment, the data management policy for the predetermined data may be used by the load balancer to determine where to send a request associated with the predetermined data. For example, utilizing the caching policy within the predetermined data, the load balancer may determine which cache of which storage node contains the predetermined data within the object-based storage system and may send a request to access the predetermined data directly to a proxy server of the object-based storage system managing data requests to the storage node.

In another example, utilizing the one or more token management policies (e.g., a GPFS token management mechanism, etc.) within the predetermined data, the load balancer may determine that a proxy server of the object-based storage system currently has a token allowing access to the predetermined data within a storage node associated with the proxy server, and the load balancer may send a request to access the predetermined data directly to the proxy server currently having the token. In another example, utilizing the one or more ring policies of the predetermined data, the load balancer may determine that a proxy server of the object-based storage system is the current owner of the predetermined data according to a ring access structure of the object-based storage system, and the load balancer may send a request to access the predetermined data directly to the proxy server that is the current owner of the predetermined data according to the ring access structure.

Additionally, in one embodiment, the data management policy for the predetermined data may be updated in response to one or more occurrences within the object-based storage system. For example, the data management policy for the predetermined data may be updated in response to a node or disk failure, rebalancing, real time monitoring of object requests, etc. In another example, the data management policy for the predetermined data may be updated, in addition to the location of the predetermined data within the object-based storage system, in response to a node or disk addition, token usage or ownership changes, etc. In another embodiment, the updated policy may be shared with the load balancer associated with the object-based storage system.

In this way, by receiving the data management policy for the predetermined data, the load balancer may be made aware of how the predetermined data is specifically stored and accessed within the object-based storage system, and may use such information to optimize the routing of requests for the predetermined data to proxy servers within the object-based storage system (e.g., by sending requests directly to proxy servers managing a storage node having the predetermined data, etc.). Additionally, the load balancer may be made aware of any ownership, locks, or tokens held by a proxy server granting the proxy server exclusive access to the predetermined data, and may use such information to optimize the routing of requests for the predetermined data to the proxy servers with exclusive access, which may thereby avoid any contention situations (e.g., ownership contention, lock contention, etc.).

As a result, the load balancer may be enhanced with an understanding of the each storage node's caching policy for stored data (e.g., objects, containers, buckets, accounts, etc.). In one embodiment, each storage node may have a different caching policy. In this way, the load balancer may directly send an object, container, or account request to the correct proxy server that has the object, container, or account cached, which may eliminate a need for a distributed caching layer and may reduce access latency.

In another embodiment, when a piece of data has already been accessed on a node, and is sitting in that node's cache, the load balancer may direct the request to the node having the cached data, instead of another node where the data isn't in the cache. In yet another embodiment, an object may be stored on three nodes in the object-based storage system, and may be cached on only one of the three nodes. In response to this configuration, a notification as to which of the three nodes has the object it its cache may be shared with the load balancer in order to optimize retrieval of the object.

Also, a storage node may implement several different caching policies depending on the architecture of the object-based storage system. These policies may be communicated to the load balancer to achieve better caching. Policies may be expressed in a variety of forms, such as algorithmic based upon some element of the request, or a static mapping, or a dynamic mapping where the load balancer asks for the correct server on each request. In another embodiment, the load balancer may receive knowledge of the current object storage protocol (e.g., S3, Swift, CDMI) in order to implement certain policies. For example, the load balancer may introspect each request and determine the required item from the request that is required to determine the correct proxy to which to send the request (e.g., object/container/account id/name, user name, object metadata attribute, etc.).

Figure 5:
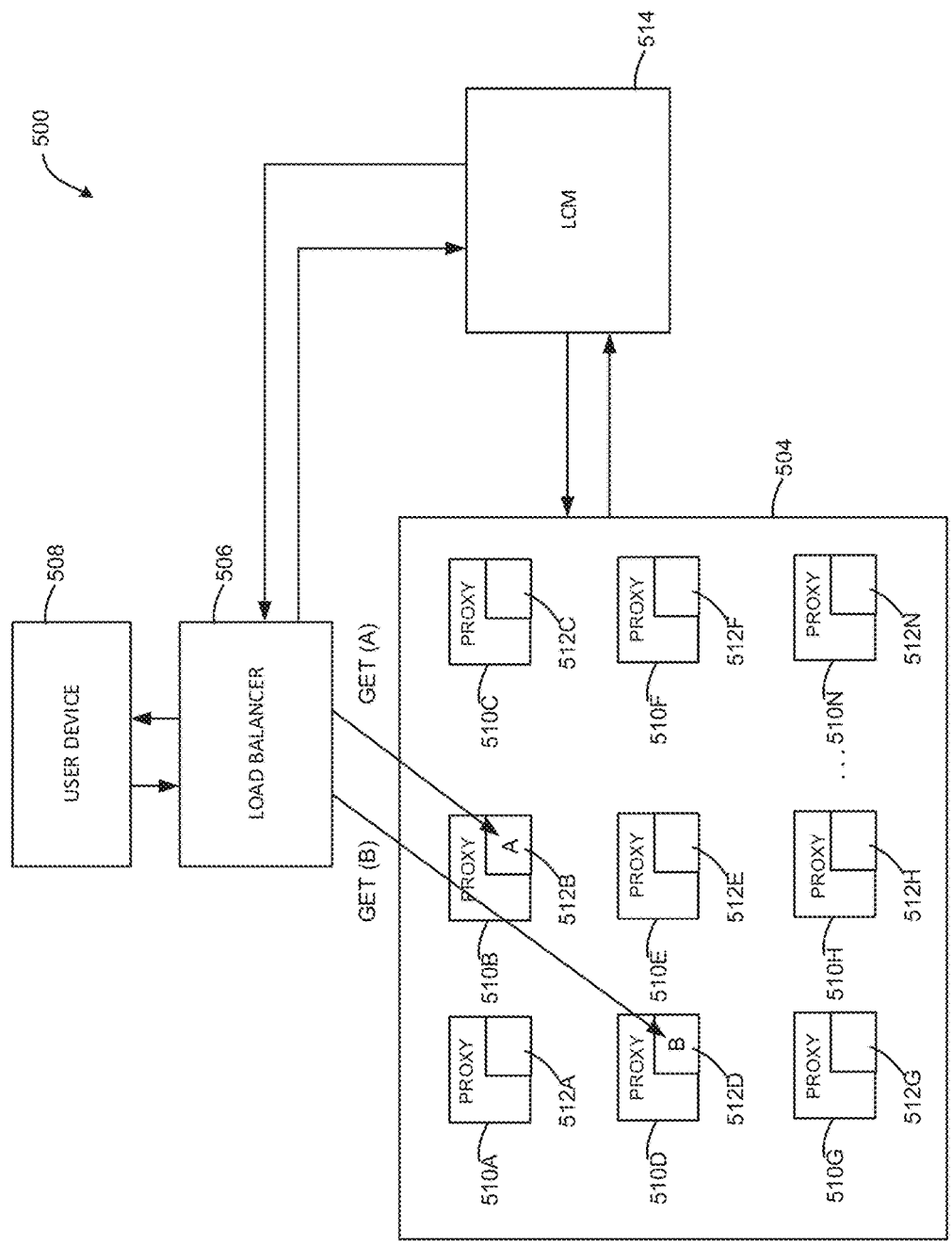
FIG. 5 illustrates an exemplary location-based storage and retrieval environment, according to one embodiment.

FIG. 5 illustrates an exemplary location-based storage and retrieval environment, according to one embodiment. As shown in FIG. 5, an exemplary location-based storage and retrieval environment 500 includes a load balancer 506 in communication with an object-based storage system 504 as well as a user device 508. In one embodiment, the user device 508 may be one of a plurality of user devices, the object-based storage system 504 may be one of a plurality of object-based storage systems (e.g., within a cloud storage environment, etc.), and the load balancer 506 may be one of a plurality of load balancers that distributes traffic (e.g., data access requests, etc.) from the plurality of user devices amongst the plurality of object-based storage systems.

Additionally, the object-based storage system 504 includes a plurality of proxy servers 510A-N, where each of the plurality of proxy servers 510A-N includes a respective storage disk 512A-N. In one embodiment, each of the plurality of proxy servers 510A-N includes a computer system or application that manages requests from the load balancer 506.

Further, the exemplary location-based storage and retrieval environment 500 includes a location and cache manager (LCM) 514. In one embodiment, the LCM 514 may monitor information associated with a plurality of data within the object-based storage system 504. For example, the LCM 514 may track one or more of objects, container, accounts, metadata, and searches within the object-based storage system 504. In another example, the LCM 514 may track a location of one or more of objects within the object-based storage system 504. In yet another example, the LCM 514 may track a hashing scheme used by the object-based storage system 504 to store cached data within the object-based storage system 504. In another embodiment, the LCM 514 may temporarily store part or all of the monitored information.

Further still, in one embodiment, the LCM 514 may share the monitored information with the load balancer 506. For example, the LCM 514 may monitor a location of a first object 512B within storage disk 512D and a second object 512D within storage disk 512B of the object-based storage system 504, and may share the monitored locations with the load balancer 506. In another embodiment, the load balancer 506 may use the monitored information shared by the LCM 514 to accurately route data requests from the user device 508.

For example, the load balancer 506 may receive from the user device 508 a get request for the first object 512B, and may utilize the known location of the first object 512B within storage disk 512D shared by the LCM 514 to route the get request directly to the storage disk 512D via the proxy server 510D. In another example, the load balancer 506 may receive from the user device 508 a get request for the second object 512D, and may utilize the known location of the second object 512D within storage disk 512B shared by the LCM 514 to route the get request directly to the storage disk 512B via the proxy server 510B.

In this way, the load balancer 506 may use the information received from the LCM 514 to accurately route data requests directly to the storage disk 512A-N that has the requested data. In another embodiment, for each of a plurality of objects, one or more proxy servers 510A-N may be dedicated to serving that object, based upon a hash of the object. The LCM 514 may communicate this hashing scheme with the load balancer 506 to allow it to redirect requests to the one of the proxy servers 510A-N that is responsible for an object (and is therefore caching it if it had been previously retrieved). As policies change, they may be synchronized with the load balancer 506 as required.

In yet another embodiment, the LCM 514 may tell the load balancer 506 that the object-based storage system 504 will cache all requests at the server at which the request was received. For example, the load balancer 506 may use a hashing or other distribution scheme to distribute object request across the proxy servers 510A-N while maintain object affinity. Over time, the load balancer 506 may track the latency of requests to a specific server for a specific object, and if the latency increases beyond a specific threshold, the load balancer 506 may begin to use another one of the proxy servers 510A-N for specific object requests to balance the load for this particularly 'hot' object.

In still another embodiment, the object-based storage system 504 may cache metadata for containers and accounts on the proxy servers 510A-N. In another embodiment, a caching policy for accounts and containers may be communicated from the object-based storage system 504 via the LCM 514 to the load balancer 506 such that the load balancer 506 may send requests for account and container information to the proxy servers 510A-N to maximize a cache hit ratio.

Additionally, in one embodiment, the load balancer 506 may continue to be stateless in that the knowledge of how and where data is to be cached may be maintained by the object-based storage system 504. In another embodiment, the load balancer 506 may maintain information about how "busy" the proxy servers 510A-N are, as well as the algorithm it should use to access objects across the proxies, upon failure, all of this information may be regenerated and re-acquired from the object-based storage system 504. In this way, the load balancer 506 may not need to keep any of this information in stable storage.

Figure 6:
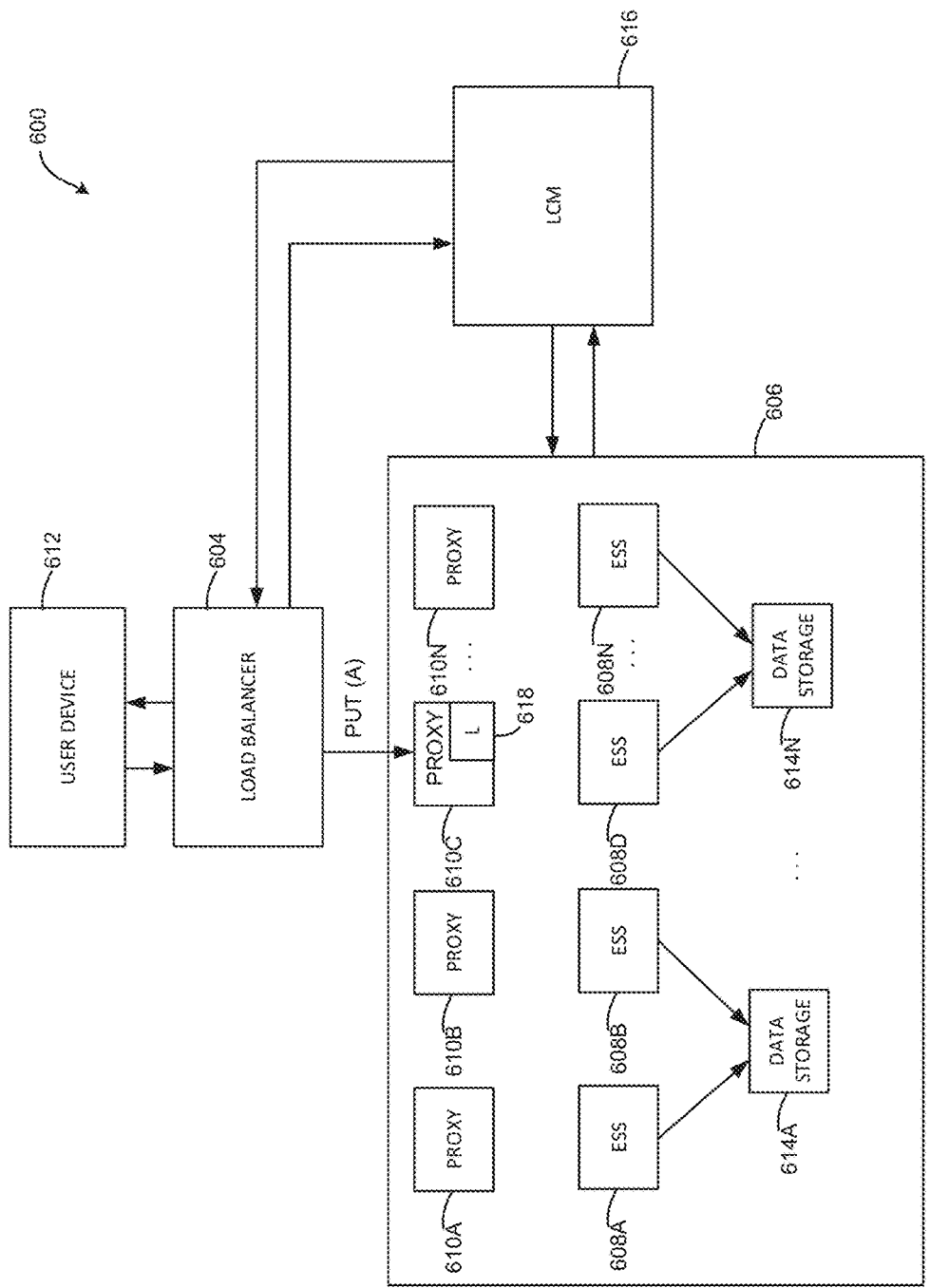
FIG. 6 illustrates an exemplary lock-based storage and retrieval environment, in accordance with one embodiment.

Now referring to FIG. 6, a flowchart of a method 600 for handling a data request utilizing a lock structure is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

FIG. 6 illustrates an exemplary lock-based storage and retrieval environment, in accordance with one embodiment. As shown in FIG. 6, an exemplary lock-based storage and retrieval environment 600 includes a load balancer 604 in communication with an object-based storage system 606 as well as a user device 612. In one embodiment, the user device 612 may be one of a plurality of user devices, the object-based storage system 606 may be one of a plurality of object-based storage systems (e.g., within a cloud storage environment, etc.), and the load balancer 604 may be one of a plurality of load balancers that distributes traffic (e.g., data access requests, etc.) from the plurality of user devices amongst the plurality of object-based storage systems.

Additionally, the object-based storage system 606 includes a plurality of proxy servers 610A-N, where the plurality of proxy servers 610A-N manage storage nodes 608A-N that in turn manage hardware data storage 614A-N. In one embodiment, each of storage nodes 608A-N may include a storage controller (e.g., an elastic storage server (ESS)) that manages data stored within the hardware data storage 614A-N.

Further, the exemplary lock-based storage and retrieval environment 600 includes a location and cache manager (LCM) 616. In one embodiment, the LCM 616 may monitor lock transaction information within the object-based storage system 606. For example, the plurality of proxy servers 610A-N may share one or more locks granting exclusive access to data within the object-based storage system 606. In another example, the LCM 616 may track one or more of objects, container, accounts, metadata, and searches within the object-based storage system 606, as well as which of the proxy servers 610A-N currently holds a lock. In another embodiment, the LCM 616 may temporarily store part or all of the monitored information.

Further still, in one embodiment, the LCM 616 may share the monitored information with the load balancer 604. For example, the LCM 616 may monitor a location of a lock 618 within proxy server 610C, and may share the monitored location with the load balancer 604. In another embodiment, the load balancer 604 may use the monitored information shared by the LCM 616 to accurately route data requests from the user device 612.

For example, the load balancer 604 may receive from the user device 612 a put request for an object that has access controlled via the lock 618, and may utilize the known location of the lock 618 within proxy server 610C shared by the LCM 616 to route the put request directly to the proxy server 610C. In this way, the load balancer 604 may use the information received from the LCM 616 to accurately route data requests directly to the proxy server 610A-N that has the lock necessary to access the data.

Figure 7:
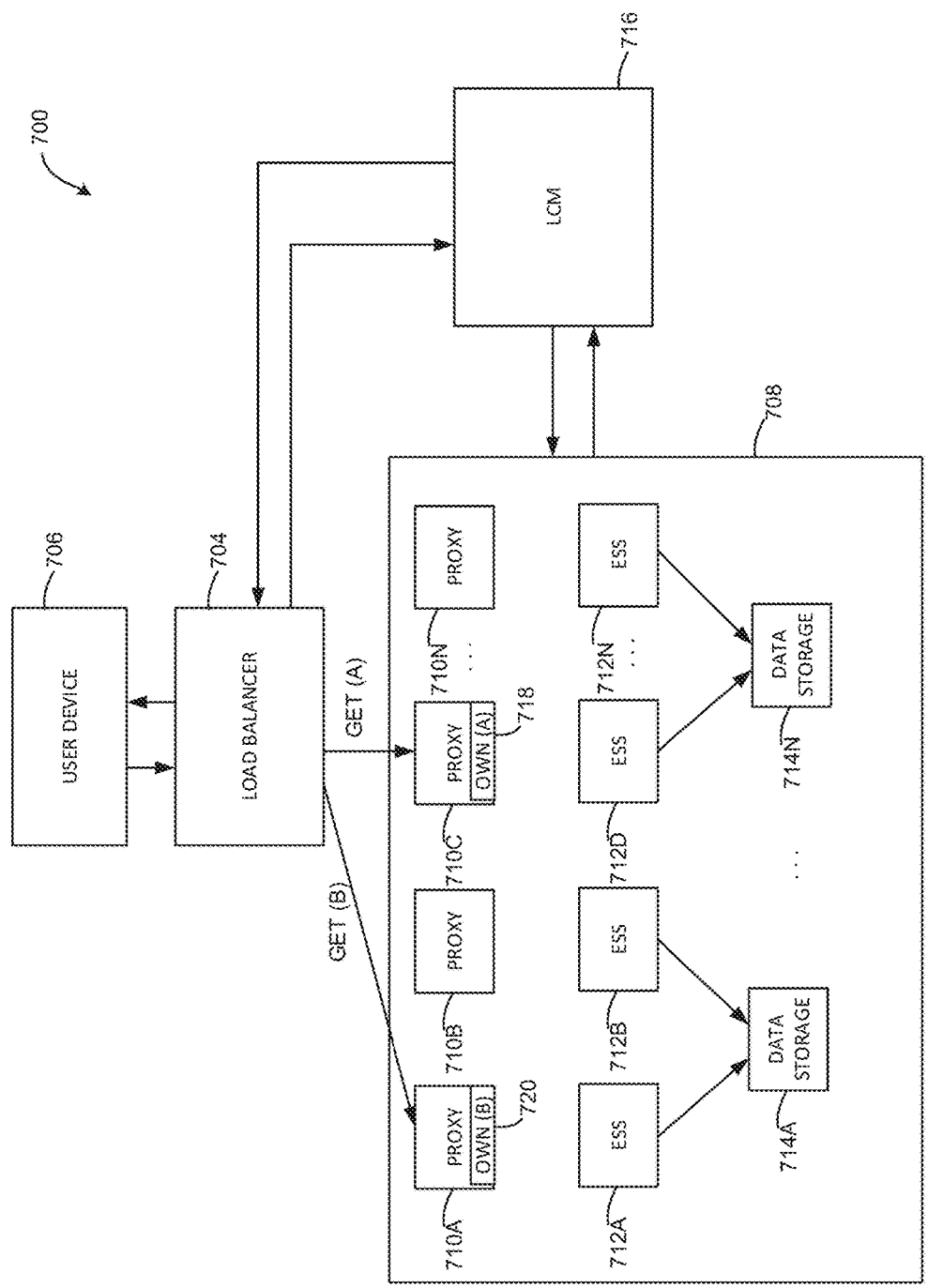
FIG. 7 illustrates an exemplary ring-based storage and retrieval environment, in accordance with one embodiment.

FIG. 7 illustrates an exemplary ring-based storage and retrieval environment 700, in accordance with one embodiment. As shown in FIG. 7, an exemplary ring-based storage and retrieval environment 700 includes a load balancer 704 in communication with an object-based storage system 708 as well as a user device 706. In one embodiment, the user device 706 may be one of a plurality of user devices, the object-based storage system 708 may be one of a plurality of object-based storage systems (e.g., within a cloud storage environment, etc.), and the load balancer 704 may be one of a plurality of load balancers that distributes traffic (e.g., data access requests, etc.) from the plurality of user devices amongst the plurality of object-based storage systems.

Additionally, the object-based storage system 708 includes a plurality of proxy servers 710A-N, where the plurality of proxy servers 710A-N manage storage nodes 712A-N that in turn manage hardware data storage 714A-N. In one embodiment, each of storage nodes 712A-N may include a storage controller (e.g., an elastic storage server (ESS)) that manages data stored within the hardware data storage 714A-N.

Further, the exemplary ring-based storage and retrieval environment 700 includes a location and cache manager (LCM) 716. In one embodiment, the LCM 716 may monitor ring-based object ownership information within the object-based storage system 708. For example, the plurality of proxy servers 710A-N may share ownership to objects utilizing a ring-based methodology within the object-based storage system 708. In another example, the LCM 716 may track one or more of objects, container, accounts, metadata, and searches within the object-based storage system 606, as well as which of the proxy servers 710A-N currently have ownership of objects. In another embodiment, the LCM 716 may temporarily store part or all of the monitored information.

Further still, in one embodiment, the LCM 716 may share the monitored information with the load balancer 704. For example, the LCM 716 may monitor an ownership 718 of a first object and an ownership 720 of a second object, and may share the ownership information with the load balancer 704. In another embodiment, the load balancer 704 may use the monitored information shared by the LCM 716 to accurately route data requests from the user device 706.

For example, the load balancer 704 may receive from the user device 706 a get request for the first object that has ownership 718 known to be held at proxy server 710C, and may route the get request for the first object to the proxy server 710C as a result. In another example, the load balancer 704 may receive from the user device 706 a get request for the second object that has ownership 720 known to be held at proxy server 710A, and may route the get request for the first object to the proxy server 710A as a result. In this way, the load balancer 704 may use the information received from the LCM 716 to accurately route data requests directly to the proxy server 710A-N that has the ring-based ownership necessary to access the data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    analyzing a plurality of data management factors within an object-based storage system;
    determining a data management policy for predetermined data within the object-based storage system, based on the analyzing, the data management policy including a token management policy within the object-based storage system; and sharing the data management policy for the predetermined data with a load balancer associated with the object-based storage system.

2. The computer-implemented method of claim 1, wherein the object-based storage system includes a plurality of storage nodes, where each of the plurality of storage nodes includes an associated proxy server.

3. The computer-implemented method of claim 1, further comprising:
identifying a change in token ownership within the object-based storage system;
updating the data management policy for the predetermined data, in response to the change in token ownership; and
sharing the updated data management policy for the predetermined data with the load balancer associated with the object-based storage system.

4. The computer-implemented method of claim 1, wherein the plurality of data management factors include one or more data caching locations.

5. The computer-implemented method of claim 1, wherein a predetermined data location is tracked within the object-based storage system according to the plurality of data management factors.

6. The computer-implemented method of claim 1, wherein the data management policy for the predetermined data is used by the load balancer to determine where to send a request associated with the predetermined data.

7. The computer-implemented method of claim 1, wherein the token management policy dictates which proxy servers are able to perform actions with respect to the predetermined data within the object-based storage system.

8. The computer-implemented method of claim 1, wherein the token management policy provides guidelines for obtaining and releasing tokens within the object-based storage system.

9. The computer-implemented method of claim 1, wherein the plurality of data management factors include one or more data placement algorithms that dictate how data is stored within the object-based storage system.

10. The computer-implemented method of claim 9, wherein the one or more data placement algorithms include one or more data routing algorithms that indicate how incoming and outgoing data is routed within the object-based storage system.

11. The computer-implemented method of claim 1, wherein the token management policy includes a GPFS token management mechanism.

12. The computer-implemented method of claim 1, wherein the token management policy includes an indication of a token currently held by a proxy server granting the proxy server exclusive access to the predetermined data.

13. The computer-implemented method of claim 1, wherein the plurality of data management factors include the token management policy, which dictates which proxy servers are able to perform actions with respect to data stored on storage nodes within the object-based storage system.

14. A computer program product for sharing a data management policy with a load balancer, the computer program product comprising a computer readable storage medium having program instructions embodied therewith, wherein the computer readable storage medium is not a transitory signal per se, the program instructions executable by a processor to cause the processor to perform a method comprising:
analyzing, by the processor, a plurality of data management factors within an object-based storage system;
determining, by the processor, a data management policy for predetermined data within the object-based storage system, based on the analyzing, the data management policy including a token management policy within the object-based storage system; and
sharing, by the processor, the data management policy for the predetermined data with a load balancer associated with the object-based storage system.

15. The computer program product of claim 14, wherein the object-based storage system includes a plurality of storage nodes, where each of the plurality of storage nodes includes an associated proxy server.

16. The computer program product of claim 14, wherein the plurality of data management factors include one or more data caching locations.

17. The computer program product of claim 14, wherein the predetermined data is tracked within the object-based storage system according to the plurality of data management factors.

18. The computer program product of claim 14, further comprising sharing an updated policy with the load balancer associated with the object-based storage system.

19. The computer program product of claim 14, wherein the plurality of data management factors include one or more data placement algorithms that dictate how data is stored within the object-based storage system.

20. A computer-implemented method, comprising:
receiving, at a load balancer, a data management policy for predetermined data within an object-based storage system, the data management policy including a token management policy within the object-based storage system;
receiving, at the load balancer, a request to access the predetermined data within the object-based storage system;
identifying a proxy server of the object-based storage system that currently has a token allowing access to the predetermined data within a storage node associated with the proxy server, utilizing the token management policy; and
sending a request to access the predetermined data directly to the proxy server of the object-based storage system that currently has the token.

* * * * *